United States Patent [19]
Padgett

[11] 3,777,080
[45] Dec. 4, 1973

[54] METHOD FOR DETECTING FAILURES IN TRUNK STATUS IDENTIFICATION CIRCUITRY

[75] Inventor: Richard A. Padgett, Lombard, Ill.

[73] Assignee: GTE Automatic Electric Laboratories Incorporated, Northlake, Ill.

[22] Filed: Oct. 2, 1972

[21] Appl. No.: 293,977

[52] U.S. Cl............................................ 179/175.2 R
[51] Int. Cl. ............................................ H04m 3/26
[58] Field of Search .............. 179/175.2 R, 175.2 C, 179/7 MM, 8 R

[56] References Cited
UNITED STATES PATENTS 2,866,008   12/1958   Walsh .......................... 179/175.2 R
3,713,104   1/1973   Stich ........................... 179/175.2 C Primary Examiner—William C. Cooper
Assistant Examiner—Douglas W. Olms
Attorney—K. Mullerheim et al.

[57] ABSTRACT

An arrangement for detecting failures in the trunk status identification circuitry which is used to determine the status of calls passing through a system. A scanpoint test is performed once during each scan cycle to determine the condition of the scanpoint circuits and the AC bus drivers which normally activate the scanpoints. The AC bus drivers also are tested for both set and reset, each time prior to activating the AC bus drivers during normal system operation.

15 Claims, 6 Drawing Figures

FIG. 2

| Label | P | 25 | 21 20 | 16 15 | 11 10 | 5 4 3 2 1 |
|---|---|---|---|---|---|---|
| BIT NO. → | | | | | | |
| FIRST PROG. WORD → | P | | | | | I 8 |
| GRP. WORD → | P | | | EGT 0 | EGU 0 | I 1 |
| POS. TENS WORD → | P | | EPT 0 | | | I 2 |
| STATUS WORDS | P | | | EPU 0 | TTT TTU SF/T FDS C G | I3, I7 |
| | P | | | EPU 1 | TTT TTU SF/T FDS C G | I3, I7 |
| | P | | | EPU 2 | TTT TTU SF/T FDS C G | I3, I7 |
| | P | | | EPU 3 | TTT TTU SF/T FDS C G | I3, I7 |
| | P | | | EPU 4 | TTT TTU SF/T FDS C G | I3, I7 |
| | P | | | EPU 5 | TTT TTU SF/T FDS C G | I3, I7 |
| | P | | | EPU 6 | TTT TTU SF/T FDS C G | I3, I7 |
| | P | | | EPU 7 | TTT TTU SF/T FDS C G | I3, I7 |
| POS. TENS WORD → | P | | EPT 1 | | | I 2 |
| POS. TENS WORD → | P | | EPT 4 | | | I 2 |
| STATUS WORD → | P | | | EPU 0 | TTT TTU SF/T FDS C G | I3, I7 |
| STATUS WORD → | P | | | EPU 7 | TTT TTU SF/T FDS C G | I3, I7 |
| GRP. WORD → | P | | | EGT 0 | EGU 1 | I 1 |
| GRP. WORD → | P | | | EGT 5 | EGU 9 | I 1 |
| POS. TENS WORD → | P | | EPT 0 | | | I 2 |
| STATUS WORD → | P | | | EPU 0 | TTT TTU SF/T FDS C G | I3, I7 |
| STATUS WORD → | P | | | EPU 7 | TTT TTU SF/T FDS C G | I3, I7 |
| START TEST WORD → | P | | | | | I 9 |
| 9 TEST BLANK WORDS | P | | | | | I12 |
| | P | | | | | I12 |
| 60 TEST GRP. WORDS | P | | TFE | EGT 0 | EGU 0 | I13 |
| | P | | TFE | EGT 5 | EGU 9 | I13 |
| DTT WORD → | P | | | | | I10 |
| DUT WORD → | P | | | | | I11 |
| END TEST WORD → | P | | | | | I14 |
| 9 TEST BLANK WORDS | P | | | | | I12 |
| | P | | | | | I12 |
| LAST PROG. WORD → | P | | | | | I 0 |
| LAST ADDRESS WORD → (CAN BE ANY ADDRESS IN MEMORY) | P | | | | | |

2761 WORDS TOTAL IN STATUS SECTION

83 WORDS TOTAL IN TEST SECTION

METHOD FOR DETECTING FAILURES IN TRUNK STATUS IDENTIFICATION CIRCUITRY

BACKGROUND OF THE INVENTION

Field of the Invention

This invention relates to a centralized automatic message accounting system. More particularly, it relates to an arrangement for detecting failures in the trunk status identification circuitry in such a system.

In the hereinafter disclosed centralized automatic message accounting system, trunk status identification circuitry is used to determine the status of calls passing through the system. A trunk scanner is connected to the trunks by a highway extending from a billing unit to each trunk, and is the means of conveying the various states of the trunks to the billing unit. Potentials on the highway leads indicate the status of the trunks.

The trunk scanner upon reading a start test word from memory activates the status identification circuitry to set up a scanpoint test, by turning on an established number of test driver circuits that send a constant test signal simultaneously to all billing unit scanpoint test cards in all the trunk frames, to determine if the contacts of the trunk circuits are open or closed. If a contact is closed, a signal is returned to a bus receiver to indicate the status of the contact.

The arrangement of the present invention provides a method for testing and detecting failures in the described trunk status indentification circuitry. The arrangement, furthermore, is such that the area where the failure occurred can be identified and indicated.

Accordingly, it is an object of the present invention to provide an improved centralized automatic message accounting system.

More particularly, it is an object to provide an arrangement for detecting failures in the trunk status identification circuitry used in such a system.

A still further object is to provide such an arrangement wherein the area within the status identification circuitry where the failure occurred can be identified.

Still another object is to provide such an arrangement wherein certain tests are performed on alternate scan cycles so that the same test functions can be used for these tests without additional memory being required.

Other objects of the invention will in part be obvious and will in part appear hereinafter.

BRIEF DESCRIPTION OF THE DRAWINGS

For a fuller understanding of the nature and objects of the invention, reference should be had to the following detailed description taken in connection with the accompanying drawings, in which:

FIG. 2 illustrates the trunk scanner memory layout for the status section and the test sections thereof;

Similar reference characters refer to similar parts throughout the several views of the drawings.

DESCRIPTION OF THE INVENTION

Figure 1:
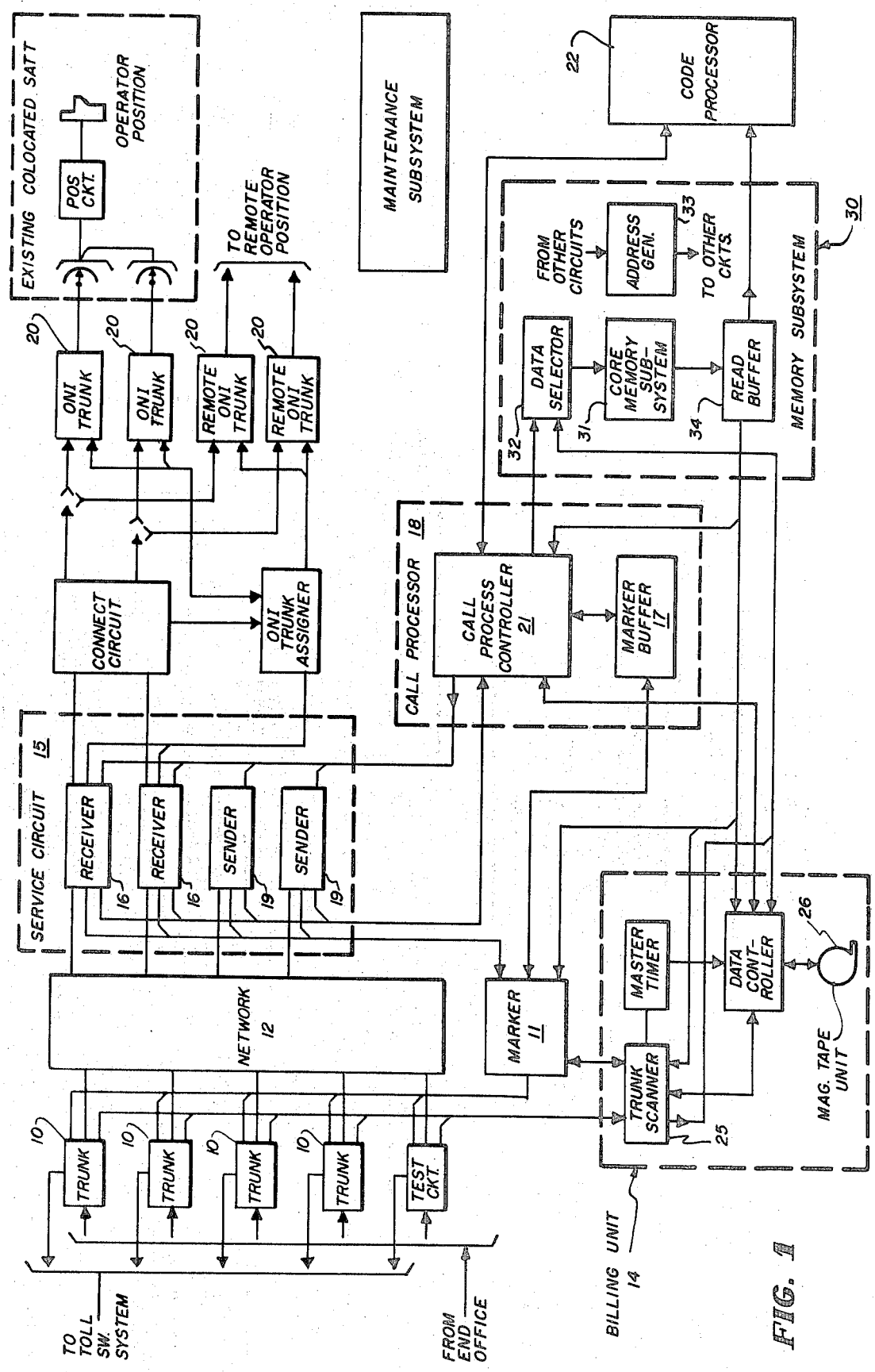
FIG. 1 is a functional block diagram of the centralized automatic message accounting system.

Referring now to the drawings, in FIG. 1 the centralized automatic message accounting system is illustrated in block diagram, and the functions of the principal equipment elements can be generally described as follows. The trunks 10, which may be either multifrequency (MF) trunks or dial pulse (DP) trunks, provide an interface between the originating office, the toll switching system, the marker 11, the switching network 12, and the billing unit 14. The switching network 12 consists of three stages of matrix switching equipment between its inlets and outlets. A suitable distribution of links between matrices are provided to insure that every inlet has full access to every outlet for any given size of the switching network. The three stages, which consist of A, B and C crosspoint matrices, are interconnected by AB and BC links. The network provides a minimum of 80 inlets, up to a maximum of 2000 inlets and 80 outlets. Each inlet extends into an A matrix and is defined by an inlet address. Each utlet extends from a C matrix to a terminal and is defined by an outlet address.

Each full size network is divided into a maximum of 25 trunk grids on the inlet side of the network and a service grid with a maximum of 16 arrays on the outlet side of the network. The trunk grids and service grid within the networks are interconnected by the BC link sets of 16 links per set. Each MF trunk grid is provided for 80 inlets. Each DP trunk grid is provided for 40 inlets. The service grid is provided for a maximum of 80 outlets. A BC link is defined as the interconnection of an outlet of a B matrix in a trunk grid and an inlet of a C matrix in the service grid.

The marker 11 is the electronic control for establishing paths through the electromechanical network. The marker constantly scans the trunks for a call for service. When the marker 11 identifies a trunk with a call for service, it determines the trunk type, and establishes a physical connection between the trunk and a proper receiver 16 in the service circuits 15.

The trunk identity and type, along with the receiver identity, are temporarily stored in a marker buffer 17 in the call processor 18 which interfaces the marker 11 and the call processor 18.

When the call processor 18 has stored all of the information transmitted from a receiver, it signals the marker 11 that a particular trunk requires a sender 19. The marker identifies an available sender, establishes a physical connection from the trunk to the sender, and informs the call processor 18 of the trunk and sender identities.

The functions of the receivers 16 are to receive MF 2/6 tones or DP signals representing the called number, and to convert them to an electronic 2/5 output and present them to the call processor 18. A calling number is received by MF 2/6 tones only. The receivers will also accept commands from the call processor 18, and interface with the ONI trunks 20.

The function of the MF senders are to accept commands from the call processor 18, convert them to MF 2/6 tones and send them to the toll switch.

The call processor 18 provides call processing control and, in addition, provides temporary storage of the called and calling telephone numbers, the identity of the trunk which is being used to handle the call, and other necessary information. This information forms part of the initial entry for billing purposes in a multientry system. Once this information is passed to the billing unit 14, where a complete initial entry is formated, the call will be forwarded to the toll switch for routing.

The call processor 18 consists of the marker buffer 17 and a call processor controller 21. There are 77 call stores in the call processor 18, each call store handling one call at a time. The call processor 18 operates on the 77 call stores on a time-shared basis. Each call store has a unique time slot, and the access time for all 77 call stores is equal to 39.4 MS, plus or minus 1 percent.

The marker buffer 17 is the electronic interface between the marker 11 and the call processor controller 21. Its primary functions are to receive from the marker 11 the identities of the trunk, receiver or sender, and the trunk type. This information is forwarded to the appropriate call store.

The operation of the call process controller revolves around the call store. The call store is a section of memory allocated for the processing of a call, and the call process controller 21 operates on the 77 call stores sequentially. Each call store has 8 rows and each row consists of 50 bits of information. The first and second rows are repeated in rows 7 and 8, respectively. Each row consists of two physical memory words of 26 bits per word. Twenty-five bits of each word are used for storage of data, and the 26th bit is a parity bit.

The call processor controller 21 makes use of the information stored in the call store to control the progress of the call. It performs digit accumulation and the sequencing of digits to be sent. It performs fourth digit 0/1 blocking on a 6 or 10 digit call. It interfaces with the receivers 16, the senders 19, the code processor 22, the billing unit 14, and the marker buffer 17 to control the call.

The main purpose of the code processor 22 is to analyze call destination codes in order to perform screening, prefixing and code conversion operations of a nature which are originating point dependent. This code processing is peculiar to the needs of direct distance dialing (DDD) originating traffic and is not concerned with trunk selection and alternate routing, which are regular translation functions of the associated toll switching machine. The code processor 22 is accessed only by the call processor 18 on a demand basis.

The billing unit 14 receives and organizes the call billing data, and transcribes it onto magnetic tape. A multi-entry tape format is used, and data is entered into tape via a tape transport operating in a continuous recording mode. After the calling and called director numbers, trunk identity, and class of service information is checked and placed in storage, the billing unit 14 is accessed by the call process controller 21. At this time, the call record information is transmitted into the billing unit 14 where it is formated and subsequently recorded on magnetic tape. The initial entry will include the time. Additional entries to the billing unit 14 contain answer and disconnect information.

The trunk scanner 25 is the means of conveying the various states of the trunks to the billing unit 14. The trunk scanner 25 is connected to the trunks by a highway extending from the billing unit 14 to each trunk. Potentials on the highway leads will indicate states in the trunks.

Each distinct entry (initial, answer, disconnect) will contain a unique entry identity code as an aid to the electronic data processing (EDP) equipment in consolidating the multi-entry call records into toll billing statements. The billing unit 14 will provide the correct entry identifier code. The magnetic tape unit 26 is comprised of the magnetic tape transport and the drive, storage and control electronics required to read and write data from and to the 9 channel billing tape. The read function will allow the tape unit to be used to update the memory.

The recorder operates in the continuous mode at a speed of five inches per second, and a packing density of 800 bits per inch. Billing data is recorded in a multi-entry format using a 9 bit EBCDIC character (extended binary coded decimal interchange code). The memory subsystem 30 serves as the temporary storage of the call record, as the permanent storage of the code tables for the code processor 18, and as the alterable storage of the trunk status used by the trunk scanner 25.

The core memory 31 is composed of ferrite cores as the storage elements, and electronic circuits are used to energize and determine the status of the cores. The core memory 31 is of the random access, destructive readout type, 26 bits per word with 16 K words.

For storage, data is presented to the core memory data registers by the data selector 32. The address generator 33 provides the address or core storage locations which activate the proper read/write circuits representing one word. The proper clear/write command allows the data selected by the data selector 32 to be transferred to the core storage registers for storage into the addressed core location.

For readout, the address generator 33 provides the address or core storage location of the word which is to be read out of memory. The proper read/restore command allows the data contained in the word being read out, to be presented to the read buffer 34. With a read/restore command, the data being read out is also returned to core memory for storage at its previous location.

The method of operation of a typical call in the system, assuming the incoming call is via an MF trunk can be described as follows. When a trunk circuit 10 recognizes the seizure from the originating office, it will provide an off-hook to the originating office and initiate a call-for-service to the marker 11. The marker 11 will check the equipment group and position scanners to identify the trunk that is requesting service. Identification will result in an assignment of a unique four digit 2/5 coded equipment identity number. Through a trunk-type determination, the marker 11 determines the type of receiver 16 required and a receiver/sender scanner hunts for an idle receiver 16. Having uniquely identified the trunk and receiver, the marker 11 makes the connection through the three-stage matrix switching network 12 and requests the marker buffer 17 for service.

The call-for-service by the marker 11 is recognized by the marker buffer 17 and the equipment and receiver identities are loaded into a receiver register of the marker buffer 17. The marker buffer 17 now scans the memory for an idle call store to be allocated for processing the call, under control of the call process controller 21. Detection of an idle call store will cause the equipment and receiver identities to be dumped into the call store. At this time, the call process controller 21 will instruct the receiver 16 to remove delay dial and the system is now ready to receive digits.

Upon receipt of a digit, the receiver 16 decodes that digit into 2/5 code and times the duration of digit presentation by the calling end. Once it is ascertained that the digit is valid, it is presented to the call processor 18 for a duration of no less than 50 milliseconds of digit and 50 milliseconds of interdigital pause for storage in the called store. After receipt of "ST", the call processor controller 21 will command the receiver 16 to instruct the trunk circuit 10 to return an off-hook to the calling office, and it will request the code processor 18.

The code processor 18 utilizes the called number to check for EAS blocking and other functions. Upon completion of the analysis, the code processor 18 will send to the call processor controller 21 information to route the call to an announcement or tone trunk, at up to four prefix digits if required, or provide delete information pertinent to the called number. If the call processor controller 21 determined that the call is an ANI call, it will receive, accumulate and store the calling number in the same manner as was done with the called number. After the call process controller 21 receives "ST", it will request the billing unit 14 for storage of an initial entry in the billing unit memory. It will also command the receiver 16 to drop the trunk to receiver connection. The call processor controller 21 now initiates a request to the marker 11 via the marker buffer 17 for a trunk to sender connection. Once the marker 11 has made the connection and has transferred the identities to the marker buffer 17, the marker buffer will dump this information into the appropriate call store. The call processor controller 21 now interrogates the sender 19 for information that delay dial has been removed by the routing switch (crosspoint tandem or similar). Upon receipt of this information the call processor controller 21 will initiate the sending of digits including "KP" and "ST". The call process controller 21 will control the duration of tones and interdigital pause. After sending of "ST", the call processor 18 will await the receipt of the matrix release signal from the sender 19. Receipt of this signal will indicate that the call has been dropped. At this time, the sender and call store are returned to idle, ready to process a new call.

The initial entry information when dumped from the call store is organized into the proper format and stored in the billing unit memory. Eventually, the call answer and disconnect entries will also be stored in the billing unit memory. The initial entry will consist of approximately 40 characters and trunk scanner 25 entries for answer or disconnect contain approximately 20 characters. These entries will be temporarily stored in the billing unit memory until a sufficient number have been accumulated to comprise one data block of 1370 characters. Once the billing unit memory is filled, the magnetic tape unit 26 is called and the contents of the billing unit memory is recorded onto the magnetic tape.

The final result of actions taken by the system on a valid call will be a permanent record of billing information stored on magnetic tape in multi-entry format consisting of initial, answer, and disconnect or forced disconnect entries.

Answer timing, force disconnect timing and other timing functions such as, for example, a "grace period" timing interval on answer, in the present system, are provided by the trunk timers. These trunk timers are memory timers, and an individual timer is provided for each trunk in a trunk scanner memory which, as can be best seen in FIG. 2, illustrates the memory layout, comprises a status section and a test section.

The status section contains 1 word per ticketed trunk. Each word contains status, instruction, timing and sequence information. The status section also provides one word per trunk group which contains the equipmemt group number, and an equipment position tens word that identifies the frame. A fully equipped status section requires 2761 words of memory representing 2000 trunks spread over 60 groups plus a status section "start" word. As each status word is read from memory, it is stored in a trunk scanner read buffer (not shown). The instruction is read by a scanner control to identify the contents of the word. The scanner control logic acts upon the timing, sequence and status information, and returns the updated word to the trunk scanner memory and it is written into it for use during the next scanner cycle.

The test section contains a maximum of 83 words: a start word, a last programmed word, 18 delay words, two driver test words, one end-test word and one word for each equipment group. The "start test" word causes a scan point test to begin. The delay words allow time for scan point filters to charge before the trunk groups are scanned, with the delay words containing only instructional data. The equipment group words contain a two digit equipment group identity and five trunk frame equipped bits. The trunk frame equipped bits (one per frame) indicates whether or not a frame exists in the position identified by its assigned bit. The delay words following the equipment group allow the scan point filters to recharge before the status section of memory is accessed again for normal scanning. The Last Program word inhibits read and write in the trunk scanner memory until a trunk scanner address generator has advanced through enough addresses to equal the scanner cycle time. When the cycle time expires, the trunk scanner address generator returns to the start of the status section of memory and normal scanning recommences.

The trunk scanner memory and the trunk scanner read buffer are not part of the trunk scanner 25, however, the operation thereof is controlled by a scanner control which forms a part of the trunk scanner 25 of the billing unit 14. The trunk scanner 25 maintains an updated record of the status of each ticketed trunk, determines from this status when a billing entry is required, and specifies the type of entry to be recorded. The entry includes the time it was initiated and the identification of its associated trunk.

Scanning is performed sequentially, by organizing the memory in such a manner that when each word is addressed, the trunk assigned to that address is scanned. This causes scanning to progress in step with the trunk scanner address generator. During the address advance interval, the next scanner word is addressed and, during the read interval, the word is read from memory and stored in the trunk scanner read buffer. At this point, the trunk scanner 25 determines the operations to be performed by analyzing the word instruction.

Figure 3:
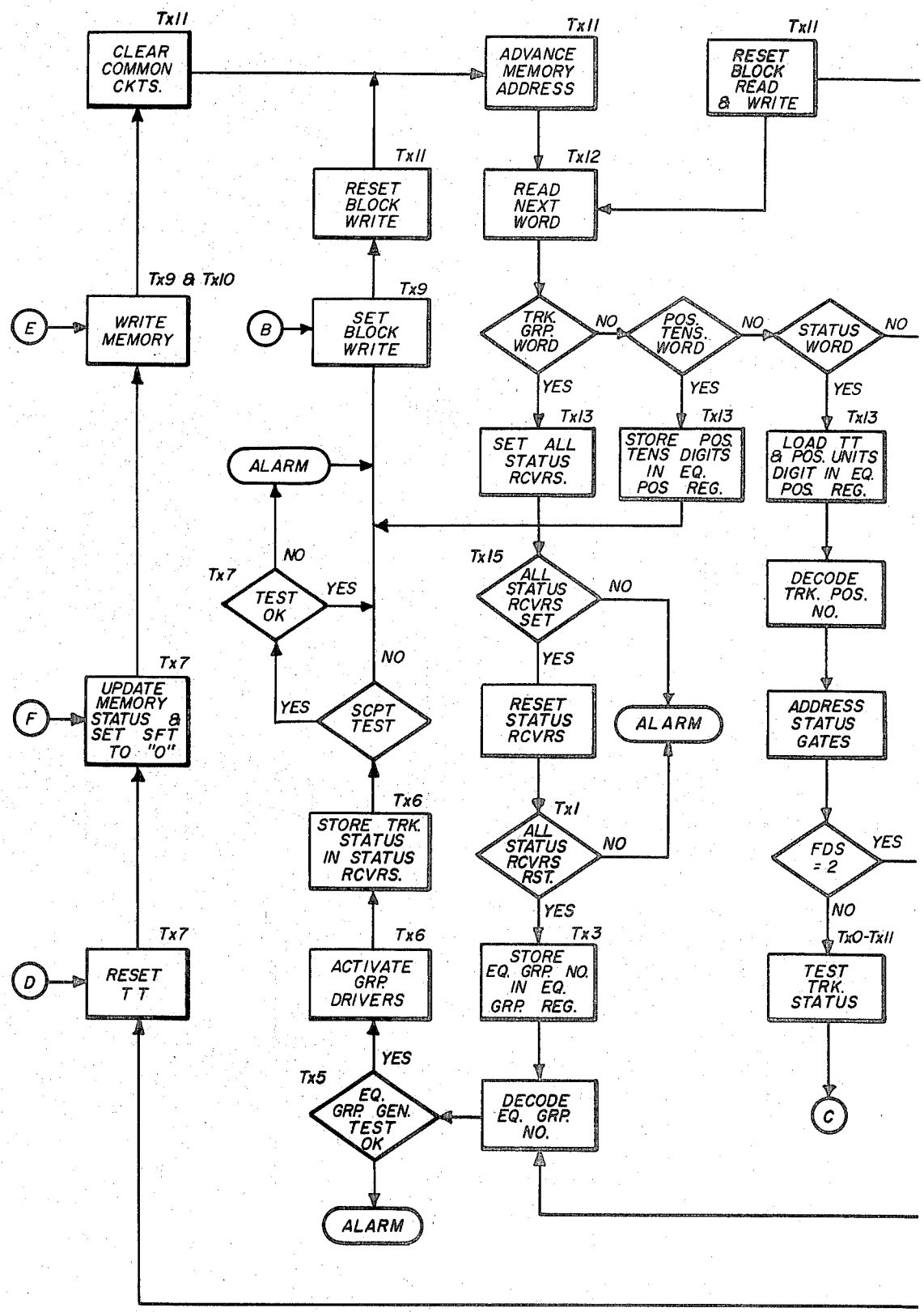
FIGS. 3-5 are a flow chart of the trunk scanner operations.
Figure 4:
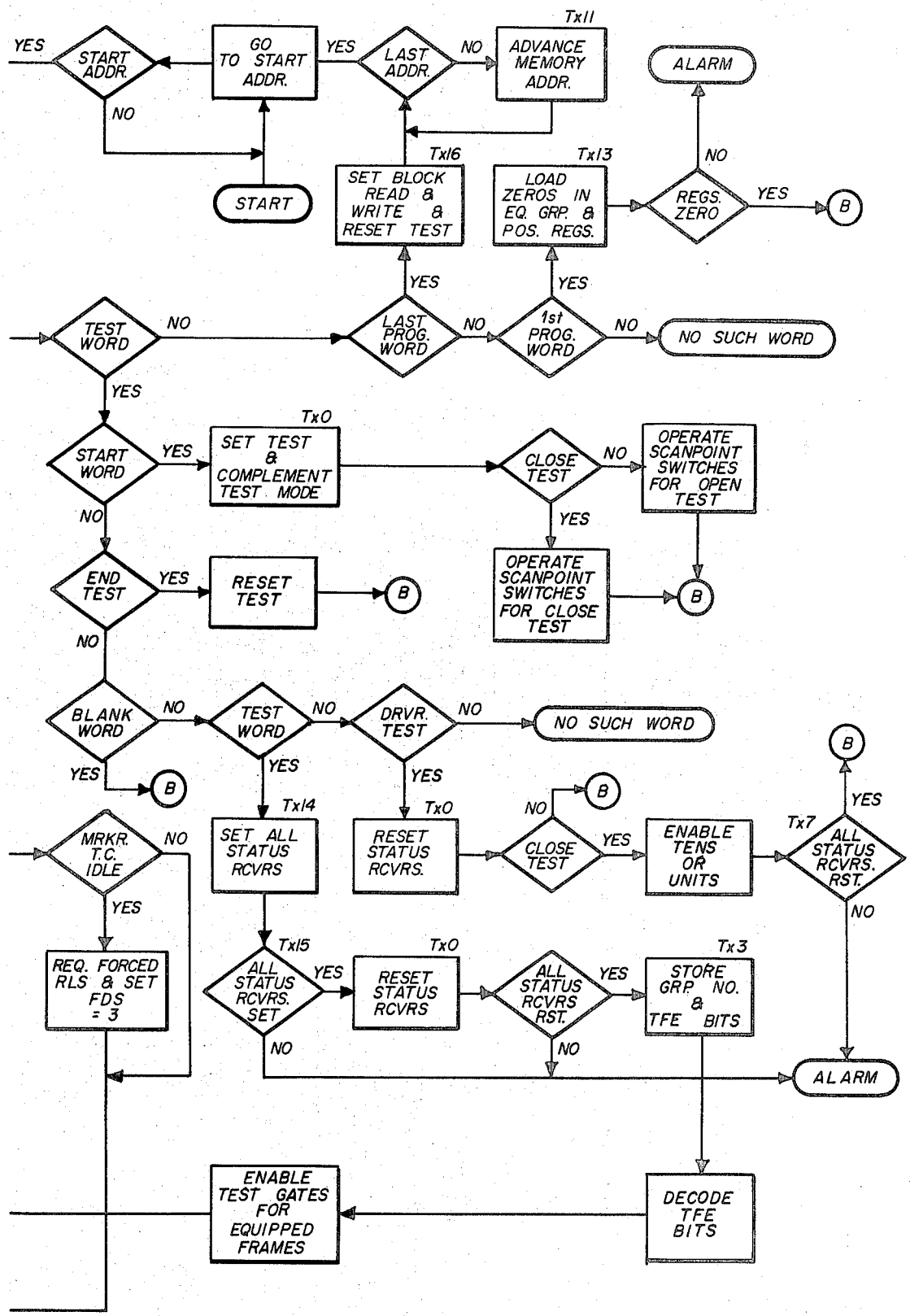
Figure 5:
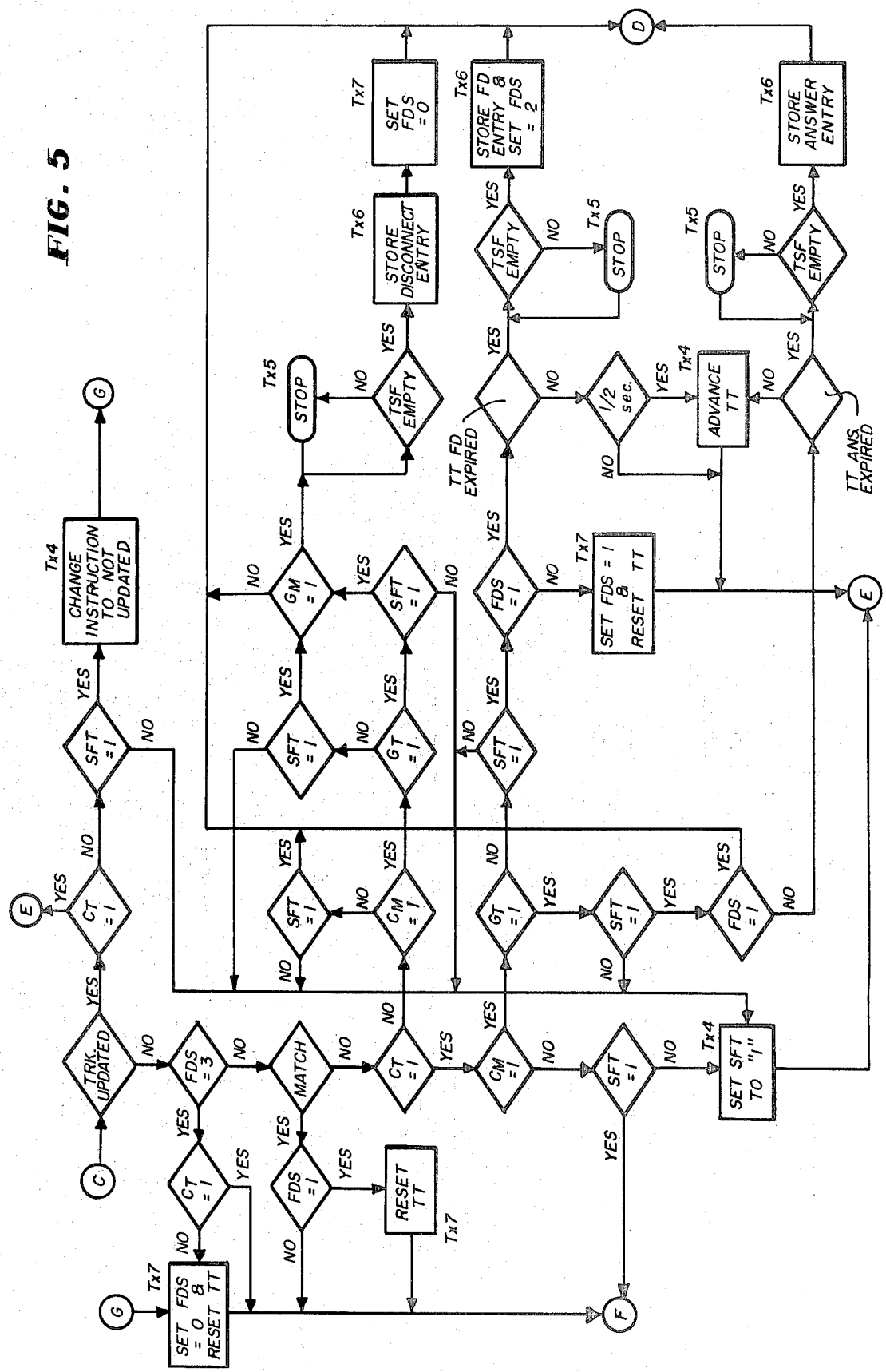

Referring now to FIGS. 3, 4 and 5, which are flow charts of the trunk scanner operations, the operation of the latter as well as the trunk timer can be described.

As indicated above, scanning is performed sequentially. If all trunks in all groups are scanned in numerical sequence beginning with trunk 0000, scanning would proceed in the following manner:

Step 1. Trunk 0000 located in frame 00 (lineup 0, column 0) in the top file, leftmost card position would be scanned first.

Step 2. All trunks located in frame 00 and the leftmost card position would be scanned next from the top file to the bottom.

Step 3. Scanning advances to frame 01 (lineup 0, column 1) and proceeds as in Step 2.

Step 4. Scanning proceeds as in Step 3 until frame 04 has been scanned.

Step 5. The scanner returns to frame 00 and Step 2 is repeated for the next to leftmost card position.

Step 6. The sequence just described continues until all ten card positions in all five columns have been examined.

Step 7. The entire process is repeated in lineups 1 through 5.

When a memory word instruction identifies a trunk group word, the status receivers are cleared to prepare for scanning the trunks specified in the group word. The trunk group digits stored in the trunk scanner read buffer (TSRB) are transferred into the equipment group register.

After the trunk group number is decoded, it is transformed into binary code decimals (BCD), processed through a 1-out-of-N check circuit, and applied to the AC bus drivers (ACBD). The drivers activate the scan point circuits via the group leads and the trunk status is returned to the receivers.

A group address applied to the drivers causes the status of all trunks in one lineup and one card position and all columns to be returned to the receivers. The group tens digit specifies the trunk frame lineup and the group units digit identifies the card slot.

When a status word is read from memory, it sets the previous count of a trunk timer (TT) into the trunk timer.

If the trunk is equipped and the forced disconnct sequence equals 2 (FDS=2), a request to force release the trunk is transmitted to the marker 11. If FDS does not equal 2, the present condition of the ticketing contacts in the trunk is tested. If the instruction indicates that the trunk is in an updated condition (the trunks associated memory word was reprogrammed) it is tested for idle. If the trunk is idle, its instruction is changed to denote that it is ready for new calls. If the trunk is not idle, no action is taken and the trunk scanner 25 proceeds to the next trunk.

If the trunk is not in the updated condition and FDS=3, the trunk is tested for idle. If the trunk is idle, FDS is set to 0 and TT is reset.

If FDS does not equal 3 and a match exists between the present contact status and the previous contact status stored in memory (bits 5 and 6) the FDS memory bits are inspected for a count equal to 1. If FDS=1, TT is reset and the memory contact status is updated. If FDS does not equal 1, TT is not reset.

During any analysis of a trunk status, a change in the contact configuration of a trunk is not considered valid until it has been examined twice.

One bit (SFT) is provided in each memory status word to indicate whether or not a change in status of the trunk was detected during the previous scan cycle.

When a change in status is detected, SFT is set to 1. If SFT=1 on the next cycle, the status is analyzed and SFT is set to 0.

If a mismatch exists between the present contact condition and that previously stored in memory, the status has changed and a detailed examination of the status is started.

If CT=1, the trunk is busy and so the previous condition of the contact is inspected. If the trunk previously was idle, CM=0. Before continuing the analysis, it must be determined if this is the first indication of change in the trunk status by examining the "second look" bit (SFT). If SFT=0, it is set to equal 1, and the analysis of this trunk status is discontinued until the next scanner cycle. If SFT=1, the memory status is updated and SFT is set to equal 0.

If CT=1, the trunk is cut through and CM is inspected to determine if the memory status was updated. If CM=1, the GT contact status must differ from GM since it was already determined that a mismatch exists. If GT=0, answer has not occurred. If GT=1, and this condition existed during the previous scan cycle, SFT=1 also. If these conditions are true and FDS does not equal 1, TT is advanced and answer timing begins. If these conditions persist for 8 scanner cycles (approximately one second), answer is confirmed and an entry will be stored in the trunk scanner formater (TSF). If answer is aborted (possibly hookswitch fumble) before the one second answer time (time is adjustable) expires, TT remains at its last count. When the answer condition returns, answer timing continues from the last TT count. Thus, answer timing is cumulative.

After an answer entry is stored, which includes the TT count, TT is reset, SFT is set to 0, and the new contact status is written into memory.

If a mismatch exists and CT=0, the previous state of this contact is inspected by examining bit 5 in the trunk scanner read buffer (TSRB). If CM=1, the state of the terminating end of the trunk is tested. If GT=1, then the condition of the trunk has just changed from answer to disconnect. If this condition existed during the previous scan cycle, SFT=1 and a disconnect entry is stored in the TSF.

After the disconnect entry is stored, which includes the TT count, TT is reset, FDS and SFT are set to 0, and the new status is written into memory.

If a mismatch exists and the originating end of a trunk is not released, both CT and CM equals 1. If GT=0 after the previous scan cycle, FDS is tested. If this change just occurred, FDS does not equal 1. Since FDS does not equal 1, it will be set equal to 1 and TT will reset. FDS=1 indicates that forced disconnect timing is in progress.

While the conditions just described exist, i.e., mismatch, CR=1, CM=1, GT=0 and FDS=1, TT will advance 1 count during each scanner cycle, if one half second has elapsed since the last scan cycle. TT will continue to advance until it reaches a count of 20 (approximately 10 seconds) when a forced disconnect entry will be stored in the TSF.

When the entry is stored, FDS is set at 2 indicating that the trunk is to be force released. After the entry is stored, which includes the TT count, TT is reset, SFT is set to 0, and the new status is written into memory.

After the status and test sections of the memory have been accessed, the Last Program word is read from memory and stored in the trunk scanner read buffer. This word causes read/write in the trunk scanner portion of memory to be inhibited and deactivates the scan point test. The trunk scanner address generator will continue to advance, however, until sufficient words have been addressed to account for one scan cycle. When a predetermined address, the Last Address, is reached, block read/write is removed and the address generator returns to the Start Address (First Program Word) of the scanner memory.

As indicated above, when a memory word instruction identifies a trunk group word, the status receivers are cleared to prepare for scanning the trunks specified in the group word. The trunk group word, after processing, is applied to the AC bus drivers (ACBD) which activate the scanpoint circuits via the group leads, and the trunk status is returned to the AC bus receivers. This occurs while the status section of the trunk scanner memory is being scanned.

A scanpoint test is performed once during each scan cycle to determine the condition of the scanpoint circuits and the AC bus drivers. This scanpoint test consists of two tests, one of which is an "open test" during which the common ground connection to the trunk ticketing contacts 60 (FIG. 6) is open. The "open test" makes all contacts appear open whether they are open or not. The second test is a "close test" that makes all ticketing contacts 60 appear closed by grounding the diodes 61 connected to each scanpoint. During this test, the common ground connection to the contacts is left open as in the "open test". The "close test" and "open test" are performed during alternate scan cycles. The AC bus driver test is performed during the "close test" cycle, all as more fully described below.

The scanpoint test begins when the test section of the trunk scanner memory is accessed, and the start test word (FIG. 2) is read out. The start test word activates various switches on all scanpoint cards (not shown) by changing the test to the alternate mode, open or close. Actual testing is delayed, however, by first accessing the nine blank words following the start test word to allow the integrating circuits in each scanpoint to charge or discharge.

By performing the "close tests" and the "open tests" on alternate scan cycles, the same test functions can be used for both tests without additional memory being required. The manner in which these tests are alternated is as follows. If the flip-flops MRE, TEST MODE, and TEST (FIG. 6) are reset, the flip-flop TEST will set when the start test word (instruction I9) is read from the trunk scanner memory. When the flip-flop TEST sets, the AND gate 62 is enabled by the coincidence of the SET output from the flip-flop TEST and the RESET output from the flip-flop MRE to, in turn, cause the flip-flop TEST MODE to set and disable both inputs to the flip-flop MRE via the AND gates 64 and 65. The flip-flop TEST MODE when set specifies that the "closed test" is to be performed.

When the end test word (instruction I14) is read, the flip-flop TEST is reset and the flip-flop MRE is caused to set, with the AND gate 64 being enabled by the coincidence of the RESET output from the flip-flop TEST and the SET output from the flip-flop TEST MODE.

On the next scan cycle, the start test word causes the flip-flop TEST to again set and, in turn, cause the flip-flop TEST MODE to reset, by means of the coincidence of the SET input from the flip-flop TEST and the SET output from the flip-flop MRE enabling the AND gate 63. The flip-flop TEST MODE, when reset, indicates that the "open test" is to be performed.

When the end test word is read again, the flip-flop TEST is reset to, in turn, cause the flip-flop MRE to reset. On the next scan cycle, the "close test" will be repeated, so that the "open test" and "close test" occur on alternate scan cycles.

When the start test word is read and the flip-flop TEST is set, the SET output also provides a TEST signal input to the test driver logic 66. The test driver logic 66, in turn, energizes 12 test drivers 67 to transmit a constant signal TOT simultaneously to all of the electronic circuits MGS2 on all of the scanpoint cards. The signal TOT is transmitted during the time that the scanpoint test is conducted, in order to de-energize the electronic circuits MGS2 to remove ground from all of the trunk circuit contacts 60. During the "close test", the SET output from the flip-flop TEST MODE is coupled as a CT signal to the test driver logic 66, and the latter energizes the test drivers 67 to transmit a signal TCT to the electronic circuits MGS1. The electronic circuits MGS1 simulate a closure of the trunk circuit contacts 60, by grounding the inputs to the scanpoints via the diodes 61. During the "open test", the RESET output of the flip-flop TEST MODE is coupled as an OT signal to the test driver logic 66 to energize the test drivers 67 such that the signal TCT de-energizes the electronic circuits MGS1. When the electronic circuits MGS1 are de-energized, ground is removed from the scanpoints, thus simulating an open trunk circuit contact 60. During a no test period, the electronic circuits MGS1 are de-energized and the electronic circuits MGS2 are energized. If the latter are not re-energized after the scanpoint test is completed, an alarm sounds.

When the scanpoint test has been established, as described above, the first group word (instruction I13) is read from memory (FIG. 2) and the equipment group number and the TFE (trunk frame equipped) bits are stored in the equipment group register. The equipment group address (tens and units) then are coupled to the AC bus drivers ACBD to energize them to provide an interrogate pulse to the scanpoints, when the strobe pulse is received coincicent therewith. The strobe pulse is a 4 $\mu$ sec. clock pulse gated to the AC bus drivers ACBD at pre-established intervals to trigger them to provide a 1 $\mu$ sec. interrogate pulse.

When the interrogate pulses are coupled to the scanpoints, during the "close test", the ground at the input of the scanpoints will cause the transistors 68 to conduct and return an AC signal to the AC bus receivers ACBR, via the conductors 69. This AC signal is stored in the AC bus receivers, and coupled to the input NAND gate 70 of the scanpoint test fail detector.

If all of the AC bus receivers ACBR do not receive such an AC signal during the "close test", the flip-flop TEST FAILED will be set, via the AND gate 74 and the OR gate 76. Upon coincidence of the strobe pulse and the TEST signal from the flip-flop TEST, the flip-flop TEST FAILED will be triggered to couple an output to an alarm circuit in the maintenance subsystem.

If during the "open test" one or more of the AC bus receivers ACBR detects or receives an AC signal pulse from the scanpoints, the AC signal again is stored and coupled to the input NAND gate 71, after being inverted by the inverters 72. The output of the NAND gate 71 is coupled through the AND gate 75 and the OR gate 76 to again set the flip-flop TEST FAILED, which upon coincidence of the strobe pulse and the TEST output of the flip-flop TEST is triggered to sound an alarm.

The AND gates 74 and 75 are enabled by the coincidence of the output of the respective NAND gates 70 and 71 by the output, OT and CT from the flip-flop TEST mode, and the TFE (trunk frame equipped) signal supplied form the equipment group register. This TFE signal is a zero if the particular frame is not equipped with scanpoints, and is provided to disable the flip-flop TEST FAILED, to prevent erroneous test results.

The AC bus drivers ACBD are tested only during the scanpoint "close test", and the test is provided by the DTT and DUT words stored in the trunk scanner memory (FIG. 2), following the test group words. When the DTT word is read, only the units address is supplied to the AC bus drivers ACBD. If any of the AC bus receivers ACBR receives an AC signal, it is an indication that the tens address lead in the AC bus driver ACBD failed, otherwise it could not have supplied an output interrogate pulse to the scanpoint. When the DUT word is read, only the tens address is supplied to the AC bus drivers ACBD, to determine if any of the unit leads in the AC bus drivers have failed. In each case, if an AC signal is received by any of the AC bus receivers ACBR, the flip-flop TEST FAILED is set to cause an alarm to be sounded.

When the end test word (instruction I14) is read from memory (FIG. 2), the scanpoint test circuitry is disabled so that normal scanning can begin again.

Figure 6:
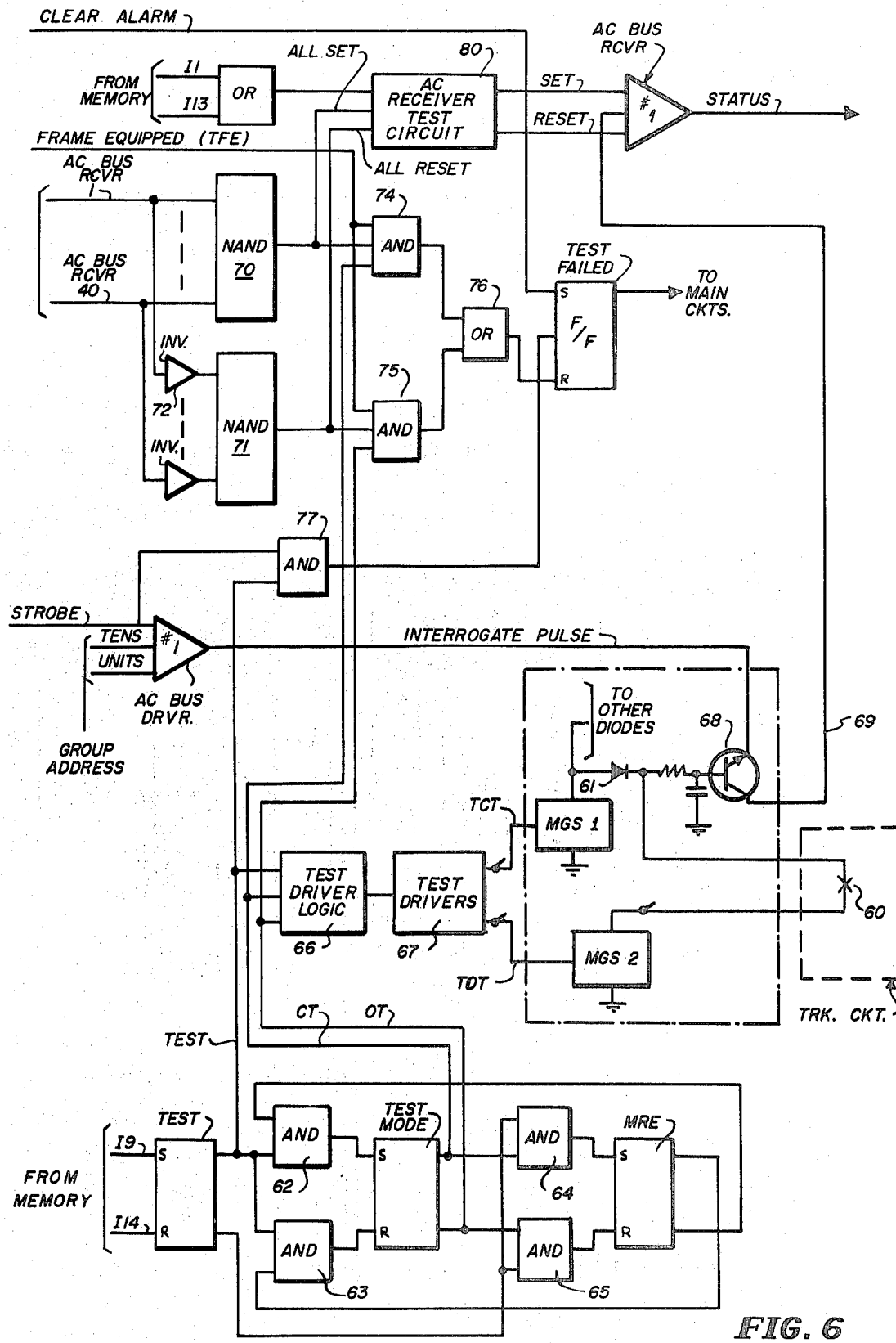
FIG. 6 is a functional block diagram of the arrangement for detecting failures in the status identification circuitry.

The AC bus receivers ACBR are tested for both set and reset, each time prior to activating the AC bus drivers to insure their operational capabilities before they are to receive AC signals from the scanpoints. As can be seen in FIGS. 2 and 6, whenever a group word (instruction I1) is read from the status section of the trunk scanner memory or a test group word (instruction I13) is read from the test section, an AC receiver test circuit 80 is energized. This circuit 80 first couples a SET pulse to all of the AC bus receivers to set them, which action causes an output signal to be coupled to the NAND gate 70. If all of the AC bus receivers ACBR set, an ALL SET signal is coupled from the output of the NAND gate 70 to the AC receiver test circuit 80. The AC bus receivers ACBR then are reset, by means of a RESET signal from the AC receiver test circuit 80, and if all reset, an ALL RESET signal is coupled from the output of the NAND gate 71 to the AC receiver tests circuit 80. The SET and RESET signals are generated at fixed time intervals, and if the ALL SET and ALL RESET signals are not received by the AC receiver test circuit within correspondingly fixed time intervals, an alarm is triggered to indicate that all of the AC bus receivers ACBR did not set, or reset.

The only portion of the above described status identification circuitry which is not specifically tested is the AC bus to the scanpoints. However, its condition is inferred through a process of elimination. That is, if all of the other tests pass, that is, the driver test, the AC bus receiver test and the scanpoint test, then the AC bus itself must have failed.

From the above description, it can be seen that the testing of the status identification circuitry is in effect a total test in that each of the various individual portions of the circuitry are specifically tested, with only the condition of the AC bus itself being left to inference. However, even in this case, a failure of an AC bus can be immediately detected, since if all of the other tests passed, the failure must be in the AC bus. Furthermore, the manner in which the tests are performed is such that the area or portion of the circuitry where the failure occurred is indicated so that corrective action can be taken immediately. Further still, by performing the "open test" and the "close test" on alternate scan cycles, the same test functions can be used for both tests without additional memory being required.

It will thus be seen that the objects set forth above among those made apparent from the preceding description, are efficiently attained and certain changes may be made in carrying out the above method and in the construction set forth. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. In a system including a plurality of trunks each of which has a trunk ticketing contact, trunk status identification circuitry for determining the open or closed status of said trunk ticketing contacts including an AC bus driver, a scanpoint and an AC bus receiver associated with each of said trunk ticketing contacts, said AC bus drivers and receivers being coupled to said scanpoints by an AC bus, and a memory for storing a plurality of memory words including a status section containing address words for addressing said trunk circuits and for storing the status thereof and a test section containing address words and test words for addressing said trunk circuits and for testing the operability of said trunk status identification circuitry, said memory words stored in said memory being addressed sequentially during each scan cycle, said address words in said status section upon being read therefrom operating said AC bus drivers to transmit an interrogate pulse to said scanpoints to activate them to provide an AC signal to said AC bus receivers to indicate the open or closed status of said trunk ticketing contacts, an arrangement for detecting failures in said status identification circuitry comprising activating means coupled to said scanpoints and operable to activate them to simulate an open and a closed status of said trunk ticketing contacts and thereby provide an "open test" and a "close test" thereof, respectively; said address words in said test section upon being read therefrom operating said AC bus drivers to transmit an interrogate pulse to said scanpoints to activate them to provide a signal to said AC bus receivers indicating the status of said trunk ticketing contacts in accordance with the simulated open or closed status thereof; all of said AC bus receivers being coupled to first and second gate means; said first gate means providing an output to trigger alarm means during said "open test" when any one of said AC bus receivers fails to provide a signal to it; and said second gate means providing an output to trigger alarm means during said "close test" when any one of said AC bus receivers fails to provide a signal to it, whereby the condition of each of said scanpoints can be tested.

2. The arrangement of claim 1, further including test mode means coupled to said activating means, said test mode means being operated when a start test word in said test section is read therefrom to energize said activating means to initiate said "open test" and said "close test" and being operated when an end test word in said test section is read therefrom to de-energize said activating means to terminate said "open test" and said "close test".

3. The arrangement of claim 2, wherein said test mode means is alternately operated during each scan cycle to energize said activating means to initiate one of said "open test" and said "close test", whereby said "open test" and said "close test" are performed during alternate scan cycles.

4. The arrangement of claim 3, wherein said activating means comprises first circuit means normally operable to couple a contact status identification potential to said trunk ticketing contacts, second circuit means operable during said "close test" to couple a contact status identification potential to said scanpoints to simulate a closed trunk ticketing contact status, test driver means coupled to said first and second circuit means, said test mode means when said start test word is read energizing said test driver means to de-energize said first circuit means to remove said contact status identification potential from said trunk ticketing contacts, said test mode means during said "close test" further energizing said second circuit means to couple said contact status identification potential to said scanpoints to simulate said closed trunk ticketing contact status and during said "open test" de-energizing said second circuit means to remove said contact status identification potential.

5. The arrangement of claim 1, wherein said address words in said test section for operating said AC bus drivers comprise a first and a second address word, said AC bus drivers being operated upon receipt of said first and second address words in coincidence, said test section further including a corresponding first address word and a corresponding second address word, each of which is separately read therefrom each scan cycle and transmitted to said AC bus drivers, the receipt of an AC signal by any one of said AC bus receivers when either said corresponding first address word or said corresponding second address word is transmitted to said AC bus drivers functioning to trigger said alarm means thereby indicating a failure of an AC bus driver, whereby said AC bus drivers can be separately tested from said scanpoints.

6. The arrangement of claim 5, wherein said AC bus drivers are tested during said "close test".

7. The arrangement of claim 1, further including AC receiver test means operated to set and reset each of said AC bus receivers, said AC bus receivers upon being set providing a signal to said first gate means and said first gate means providing an ALL SET signal to said AC receiver test means when all of said AC bus receivers set, said AC bus receivers upon being reset providing a signal to said second gate means and said second gate means providing an ALL RESET signal to said AC receiver test means when all of said AC bus receivers reset, said AC receiver test means activating alarm means when said ALL SET and ALL RESET signals are not received within an established time interval, whereby the condition of each of said AC bus receivers can be tested.

8. The arrangement of claim 7, wherein said AC receiver test means are operated to set and reset said AC bus receivers each time an address word in said status section is read therefrom.

9. The arrangement of claim 1, wherein said test section of said memory further includes as a part of said address words a trunk equipped word indicating those trunk circuits equipped with scanpoints, said trunk equipped words being transmitted in coincidence with the output of said first and second gate means to trigger said alarm, whereby those trunk circuits which are not equipped with scanpoints do not cause a faulty alarm indication.

10. The arrangement of claim 5, further including AC receiver test means operated to set and reset each of said AC bus receivers, said AC bus receivers upon being set providing a signal to said first gate means and said first gate means providing an ALL SET signal to said AC receiver test means when all of said AC bus receivers set, said AC bus receivers upon being reset providing a signal to said second gate means and said second gate means providing an ALL RESET signal to said AC receiver test means when all of said AC bus receivers reset, said AC receiver test means activating alarm means when said ALL SET and ALL RESET signals are not received within an established time interval, whereby the condition of each of said AC bus receivers can be tested.

11. A method of detecting failures in the status identification circuitry in a system including a plurality of trunks each of which has a trunk ticketing contact, trunk status identification circuitry for determining the open or closed status of said trunk ticketing contacts including an AC bus driver, a scanpoint and an AC bus receiver associated with each of said trunk ticketing contacts, said AC bus drivers and receivers being coupled to said scanpoints by an AC bus, and a memory for storing a plurality of memory words including a status section containing address words for addressing said trunk circuits and for storing the status thereof and a test section containing address words and test words for addressing said trunk circuits and for testing the operability of said trunk status identification circuitry, said memory words stored in said memory being addressed sequentially during each scan cycle, said address words in said status section upon being read therefrom operating said AC bus drivers to transmit an interrogate pulse to said scanpoints to activate them to provide an AC signal to said AC bus receivers to indicate the open or closed status of said trunk ticketing contacts, said method comprising the steps of activating said scanpoints to simulate an open and a closed status of said trunk ticketing contacts and thereby provide an "open test" and a "close test" thereof, respectively; reading said address words in said test section and transmitting them to said AC bus drivers to operate them to transmit an interrogate pulse to said scanpoints to activate them to provide a signal to said AC bus receivers indicating the status of said trunk ticketing contacts in accordance with the simulated open or closed status thereof; coupling all of said AC bus receivers to first and second gate means; said first gate means providing an output to trigger alarm means during said "open test" when any one of said AC bus receivers fails to provide a signal to it; and said second gate means providing an output to trigger alarm means during said "close test" when any one of said AC bus receivers fails to provide a signal to it, whereby the condition of each of said scanpoints can be tested.

12. The method of claim 11, further including the steps of activating said scanpoints to perform said "open test" and said "close test" on alternate scan cycles.

13. The method of claim 11, further including the steps of setting and resetting said AC bus receivers and providing a signal to activate alarm means when any one of said AC bus receivers fails to set or reset.

14. The method of claim 13, wherein said AC bus receivers are set and reset each time an address word in said status section is read from memory.

15. The method of claim 13, further including the step of transmitting a signal corresponding to a portion of the address word in said test section normally used to activate said AC bus drivers to them, and activating said alarm means if any one of said AC bus receivers receives a signal from said scanpoints, whereby the operability of said AC bus drivers can be tested.

* * * * *